Patented Aug. 21, 1951

2,564,970

UNITED STATES PATENT OFFICE 2,564,970

LIQUID-LIQUID CONTACTING

George H. Hanson, Bartlesville, Okla., assignor to Phillips Petroleum Company, a corporation of Delaware Application November 8, 1946, Serial No. 708,737

14 Claims. (Cl. 260—676)

This invention relates to liquid-liquid extraction and has both apparatus and method aspects. In a preferred embodiment it relates to a feasible mode of converting an existing fractional distillation or extractive distillation column to efficient liquid-liquid extraction service.

The general problem with which the present invention is concerned is the separation of compounds whose normal volatilities are such that the separation cannot be accomplished easily by ordinary distillation methods. The problem is especially serious in the case of separation of olefins from paraffins and diolefins from olefins, particularly butylenes from normal butane and 1,3-butadiene from normal butylene. The problem of such separation arises in the manufacture of butadiene from normal butane by 2-stage catalytic dehydrogenation, the normal butane being converted to normal butylenes in the first stage and the normal butylenes being converted to butadiene in the second stage.

At present these separations are accomplished either by extractive distillation processes which alter the relative volatilities of the compounds or by processes such as the copper-ammonium acetate process wherein one of the compounds enters into loose chemical combination with the solution and is thus removed from the stream being processed. The heat requirement of extractive distillation processes are unduly large compared with the heat theoretically necessary to make the separations. At the high temperatures necessary in extractive distillation processes the solvents which are always expensive, and which are typified by furfural, deteriorate. In addition, at these high temperatures there are many corrosion difficulties. The presence of excessive quantities of acetylene and ammonia in the finished product constitutes two major disadvantages of the copper-ammonium acetate process. Acetylene in the finished butadiene results in inferior rubber. Ammonia in the butadiene seriously retards the polymerization process.

When liquid-liquid extraction methods are used, the separations can be accomplished with a fraction of the energy requirements of the extractive distillation processes. The disadvantages of solvent deterioration and corrosion are also overcome. In addition, when liquid-liquid extraction processes are used, the finished product does not contain the excessive quantities of ammonia which are present when the copper-ammonium acetate process is used.

Liquid-liquid extraction can be accomplished in mixing-settling units, spray and packed towers, and perforated tray and bubble-cap towers. The butadiene plants which use an extractive distillation process are equipped with very large extractive distillation towers, which are bubble-cap towers. My invention particularly concerns the utilization of the existing extractive distillation equipment when a liquid-liquid extraction process replaces an extractive distillation process. Liquid-liquid contacting with bubble-cap towers or perforated trays ordinarily results in contactive efficiencies which are too low. See for example Perry's "Chemical Engineers Handbook" second edition, 1941, page 1257, where Perry states that when the usual design bubble-cap columns are used for liquid-liquid contacting, plate efficiencies no more than 5 per cent are commonly encountered. Perry further states that considerable modification of the bubble-plate column design is necessary in order to successively conduct an extraction process.

Since the separation of normal butylenes from normal butane and of 1,3-butadiene from normal butylenes by liquid-liquid contacting will require about 10 or 12 theoretical contacts, about 200 actual trays would ordinarily be necessary for such separations if the tray efficiency is only of the order of 5 per cent. Extractive distillation towers for such separation usually contain 100 trays and unless their contacting efficiencies can be greatly increased, the conversion of the tower from extractive distillation service to liquid-liquid extraction service cannot be made.

The principal object of the present invention is to provide an improved method and apparatus for liquid-liquid contacting. Another object is to increase the efficiency of countercurrent liquid-liquid extraction in a bubble-cap or perforated tray column. Another object is to provide a simple and economical method and means of converting a conventional bubble-tray fractional distillation column to liquid-liquid extraction service. Another object is to provide a method and means of converting existing extractive distillation columns to liquid-liquid extraction service for which they were not designed. Another object is to provide an improved method and apparatus for separating mixtures of aliphatic hydrocarbons of varying degrees of unsaturation into a fraction of more saturated hydrocarbons and a fraction of more unsaturated hydrocarbons. Another object is to provide a method and apparatus particularly adapted for the separation of normal butylenes from normal butane or of 1,3-butadiene from normal butylenes. Numerous other objects of the present invention will hereinafter appear.

In the accompanying drawing.

In Fig. 3 the solvent flows downwardly through the bubble caps which have been placed on the lower side of the trays instead of being in their usual position above the trays. The contacting takes place immediately below the bubble caps.

In accordance with my invention continuous countercurrent liquid-liquid extraction is carried out in a vertical column having horizontal trays separating it into a plurality of superimposed contacting and separating zones. The solvent is introduced continuously to the top of the column, extract phase is withdrawn continuously from the bottom of the column, the feed is introduced continuously at a point well below the top of the column usually at an intermediate point in the column, and a raffinate phase is withdrawn continuously from the top of the column. The improvement of my invention comprises greatly increasing the tray efficiency of the column by recycling both the extract and raffinate phases throughout the column, that is from one end of the column to the other. The extract phase is recycled up the column and the raffinate phase is recycled down the column. I have found that by recycling both extract and raffinate phases in this manner, the tray efficiency of the column can be increased from a value of the order of 5 per cent to a value of the order of 10 per cent or more.

In accordance with my invention, several efficient extraction stages are created within the column by recycling raffinate phase by withdrawing same from a plurality of points spaced along the column and re-introducing the withdrawals of raffinate phase at a plurality of points located below the points of withdrawal, and recycling extract phase by withdrawing same from a plurality of points along the column and re-introducing the withdrawals of extract phase at a plurality of points located above the points of withdrawal.

Generally the withdrawals of extract phase and raffinate phase are reintroduced at points which are not above and not below, respectively, the next higher and the next lower, respectively, points of withdrawal of extract and raffinate phases. However, it is to be understood that, if desired, the withdrawals of extract phase may be re-introduced at points above the next higher points of withdrawals of extract phase and similarly the withdrawals of raffinate phase may be re-introduced at points below the next lower points of withdrawal of raffinate phase whereby overlapping occurs.

The points at which raffinate and extract phases are withdrawn for recycle in accordance with my invention are generally spaced at least three trays apart along the column and often more trays apart. Generally they are spaced not more than six trays apart, although it is within the purview of my invention to have them spaced further than six trays apart say up to as many as ten trays apart. The total number of trays in the column divided by the number of trays in each section gives the minimum number of theoretical contacts. While I refer to sections and to dividing the column into a plurality of sections each of which comprises a plurality of trays, it is to be understood that these sections are mentioned merely for convenience in discussion and that they are not shut off from one another but that continuous sections are in the same free communication with each other as adjacent sections of a fractional distillation column.

Generally for convenience the recycle of raffinate phase and of extract phase extend over approximately the same trays. That is the points of withdrawal and re-introduction of both raffinate and extract phases are closely adjacent one another. The points of re-introduction and the next lower or higher points of withdrawal may be at the same tray provided suitable precautions are taken to avoid "short-circuiting" which would nullify the separation value of the process. Or the points of re-introduction may be spaced one or more trays away from the next lower or higher points of withdrawal. For example, the withdrawals of raffinate phase may be re-introduced at a point a plurality of trays below the points of withdrawal and at least a tray above the next lower points of withdrawal of raffinate phase and similarly the withdrawals of extract phase may be re-introduced at points at least a tray below the next higher points of withdrawal of extract phase.

In accordance with my invention a fractional distillation column having the usual horizontal bubble trays or perforated trays and the usual means (known as downcomers) for allowing one liquid phase to pass from one tray to an adjacent tray is divided into a plurality of superimposed sections, each section comprising a plurality of trays and usually including at least three but not more than six trays, the feed is introduced at an intermediate point, the solvent is introduced at the top, the reflux is introduced at the bottom, the extract phase is caused to flow downwardly through the column and to intimately contact the raffinate phase which is caused to flow upwardly through the column, the extract phase is withdrawn from the bottom, the raffinate phase is withdrawn from the top, streams of raffinate phase are continuously withdrawn from the top of each of the sections and re-introduced into the bottom of each section, and streams of extract phase are continuously withdrawn from the bottom of each section and re-introduced into the top of each of the sections.

The recycling of raffinate and extract phases is preferably carried out through conduits mounted along the outside of the column. Each of these conduits contains a pump of the size required to move the withdrawn stream to the desired position.

I generally prefer to use liquid reflux and to introduce the feed into an intermediate point in the column. The reflux is a liquid portion of the extracted material which has been separated from the extract phase withdrawn from the bottom of the column. The reflux is introduced continuously into the bottom of the column. It serves to displace undesired material from the extract phase and thus to give a higher degree of separation. For example when my invention is used to separate normal butylenes from normal butane the normal butane constitutes the raffinate and the normal butylenes which constitute the extract are dissolved in the solvent to form the extract phase; the extract phase is treated in any suitable manner to recover the dissolved normal butylenes therefrom and a suitable portion of the resulting normal butylenes fraction is reintroduced continuously into the bottom of the extraction column as reflux; this reflux serves to displace any dissolved normal butane from the solvent phase.

When my invention is applied to an existing bubble plate fractional distillation (which term, as used herein, includes extractive distillation) column, I often prefer to leave the interior of the column as it is and simply to apply the recycle lines to the exterior of the column in the appropriate manner which will more fully hereinafter appear. In such case I prefer to allow the solvent to descend through the column by passage across the bubble plates and down the downcomers, and to cause the feed or raffinate phase to ascend the column by passage through the bubble caps. Intimate dispersal of the raffinate phase into the layer of solvent or extract phase with intimate contact between the two phases takes place in the zones immediately surrounding the bubble caps.

If desired, however, I may invert the bubble caps on the trays, that is remove them from their usual position and replace them on the under side of the trays. In such case I prefer to allow the solvent phase to pass downwardly through the inverted bubble caps into intimate contact with the feed or raffinate phase and to allow the latter phase to ascend the column through the downcomers.

A much less preferred embodiment of my invention involves allowing the bubble caps to remain in their usual position above the plates and to cause the solvent to pass downwardly through the bubble caps into contact with the raffinate phase below the trays, the raffinate phase ascending through the downcomers. This arrangement is seldom satisfactory because of poor distribution of the solvent phase in the raffinate phase.

As applied to a perforated tray type of column my invention may involve causing the solvent phase to descend through the perforated trays into intimate contact with the raffinate phase and allowing the raffinate phase to ascend the column through the means which would ordinarily serve as downcomers in fractional distillation service.

Ordinarily in practicing my invention, I do not use forced circulation on the solvent but simply introduce the solvent to the top of the column under pressure only sufficient to get it into the column and allow it to pass downwardly solely under the influence of gravity. Thus I contemplate mere gravity contact to effect washing of the feed with the solvent. The feed is generally introduced under only sufficient pressure to cause it to pass upwardly through the column. The liquid reflux likewise is introduced into the bottom of the column under a head just sufficient to accomplish the desired upflow of raffinate phase throughout the length of the column.

The rate of recycle may vary over wide limits. For best results I have found that it should be at least equal to the rate of introduction of feed and fresh solvent to the column. Even better results are obtained when the recycle rates are twice the rates of introduction of feed and solvent. For example if feed and reflux are each being introduced at the rates of 200 gallons per minute, and solvent is being introduced at a rate of from 1000 to 2000 gallons per minute, I prefer to recycle each of the raffinate and the extract phases throughout the column at a rate of 200 gallons per minute and 400 gallons per minute is still more satisfactory. These figures for recycle rates are for each of the recycle streams from the top to the bottom of the column.

Figure 1:
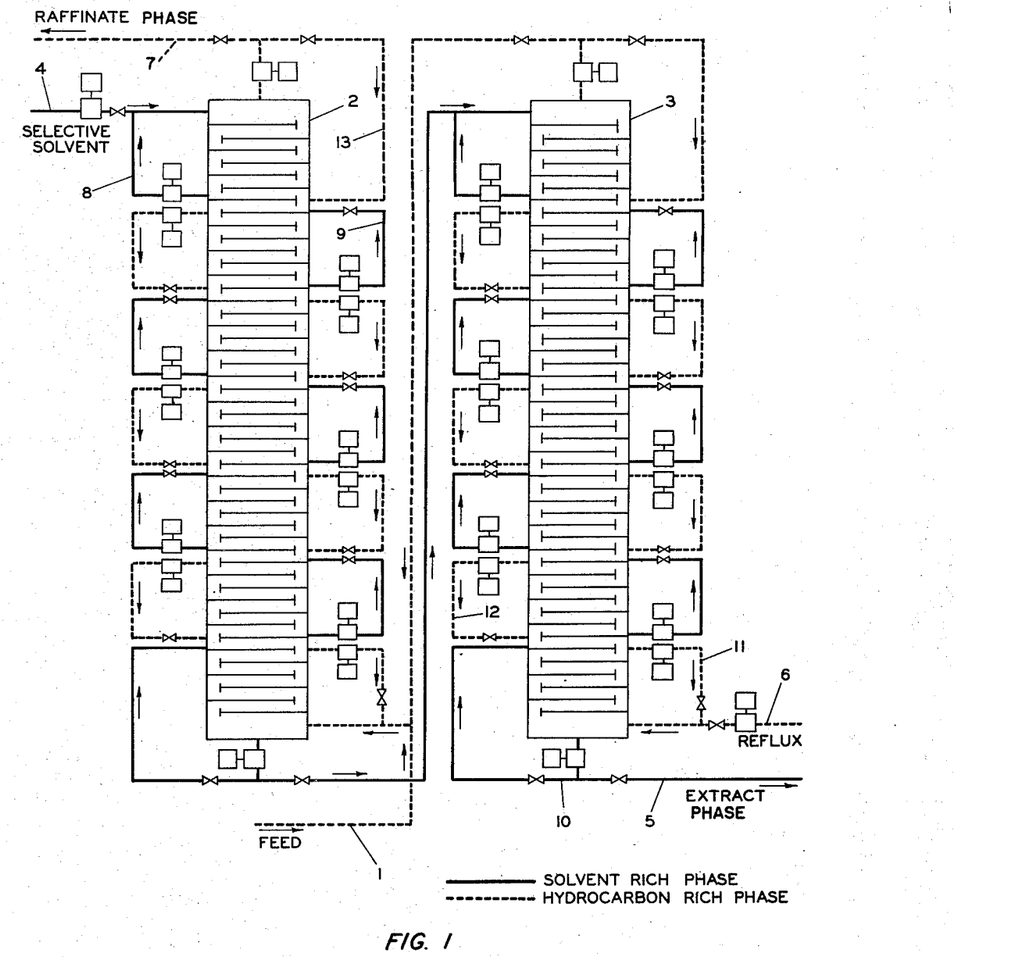
Fig. 1 is a diagrammatic view showing a preferred method of converting a bubble-cap fractional distillation column to liquid-liquid extraction service in accordance with my invention.

In Fig. 1 of the drawings, the feed enters the middle of the column via line 1. The column is shown as divided into two equal sections 2 and 3 but these sections together function as a single column, it being as though the left-hand section 2 were mounted on top of the right-hand section 3. Columns having in the order of 100 trays or more are commonly split into two sections in this manner in order to avoid excessive heights. For simplicity trays and downcomers of the column 2, 3 are indicated diagrammatically only. The fresh solvent is introduced via line 4 and extract phase leaves the column via line 5. Reflux enters via line 6. Raffinate phase leaves via line 7.

As used in this specification the term "reflux" is used interchangeably with the term "enriching liquid," as is customary in the field of liquid-liquid contacting.

The arrangements of the plates and downcomers in Fig. 1 are such that the solvent-rich phase is dispersed in the hydrocarbon-rich phase.

The invention resides in recycling both raffinate and extract phases throughout the column length in the manner shown in Fig. 1. To this end a stream of extract phase is continuously withdrawn at a point located a number of trays below the top of section 2 via line 8 and recycled for introduction with the incoming selective solvent. A second stream of extract phase is continuously withdrawn at a point still further down the column via line 9 and re-introduced at a point located one tray below the point at which line 8 takes off. This withdrawal and re-introduction of extract phase is continued throughout the column length. At the bottom of section 3 a portion of the withdrawn extract phase is re-introduced via line 10 at a point located one tray below the next higher point of take-off of extract phase.

In a similar manner raffinate phase is recycled down the column. Thus a stream of raffinate phase is withdrawn via line 11 at a point located several trays from the bottom of the column (in fact located essentially opposite the point at which line 10 enters the column) and is re-introduced at the bottom of the column with the reflux. A second stream of raffinate phase is withdrawn via line 12 from a point located a plurality of trays above the point at which line 11 takes off, and is re-introduced just above the point at which line 11 takes off. This recycling of raffinate phase every few trays continues to the top of the column. At the top a portion of the final raffinate phase is recycled via line 13 to a point several trays below the top and in fact located substantially at the same level as that at which lines 8 and 9 take off.

It will be understood of course that the recycle lines are connected to the column in such manner as not to interfere with the proper operation of the column. For example, they should enter in such a way as to insure against "short-circuiting." In some cases it may be desirable to have the recycle lines spaced angularly around the column periphery in a manner different from that indicated in Fig. 1.

The proper application of the principles of my invention to any given fractional distillation column will be obvious to those skilled in the art in the light of my disclosure.

Figure 2:
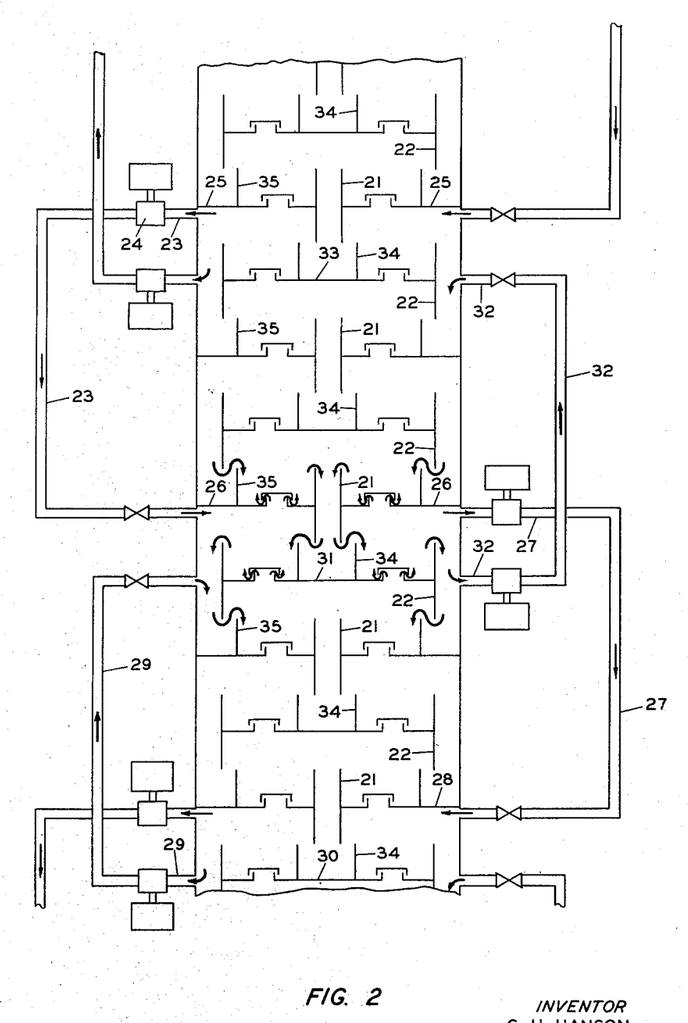
Fig. 2 is a detailed vertical sectional view of a portion of a bubble-cap column of conventional type which was designed for extractive distillation but which has been converted to efficient liquid-liquid extraction service in accordance with my invention.

Fig. 2 of the drawings shows one method of applying my invention to a fractional distillation column of the type sometimes known as the "split crossflow" or "ring and doughnut" construction. This figure shows a portion only of the column, the arrangement shown being employed throughout the column length.

In Fig. 2 the downcomers take the form alternately of chimneys 21 located in the center of the bubble trays and of rings 22 surrounding the bubble trays. The hydrocarbon-rich phase is withdrawn via line 23 (containing pump 24) from a point just below tray 25 and re-introduced at a point just below tray 26 which is the fourth tray below tray 25. Hydrocarbon-rich phase is withdrawn on the opposite side of the column via line 27 which takes off at a point just below tray 26 and is re-introduced at a point just below tray 28.

Solvent-rich phase is withdrawn via line 29 from a point opposite tray 30 behind a downcomer 22 and is re-introduced at a point opposite tray 31 which is the fourth tray above tray 30, the re-introduction being outside a downcomer 22. Similarly solvent-rich phase separated on tray 31 and flowing down a downcomer 22 is withdrawn via line 32 and re-introduced at a point opposite tray 33, introduction of the recycle being into the downcomer associated with tray 33.

The interior of the column of Fig. 2 is entirely unchanged from that which it had when in fractional distillation or extractive distillation service. The only change is the application of the recycle lines 23, 27, 29, 32, etc. to the outside of the column.

The hydrocarbon-rich phase passes up through the bubble caps as is indicated by the light arrows and intimate dispersal thereof into the solvent-rich phase takes place immediately around and above the bubble caps. The solvent-rich phase overflows the tops of the downcomers 21 and 22 and passes downwardly therethrough. The usual sealing rings 34 and 35 are provided and cooperate in the ordinary way with downcomers 21 and 22 respectively to prevent hydrocarbon-rich phase from going up the downcomers.

Figure 3:
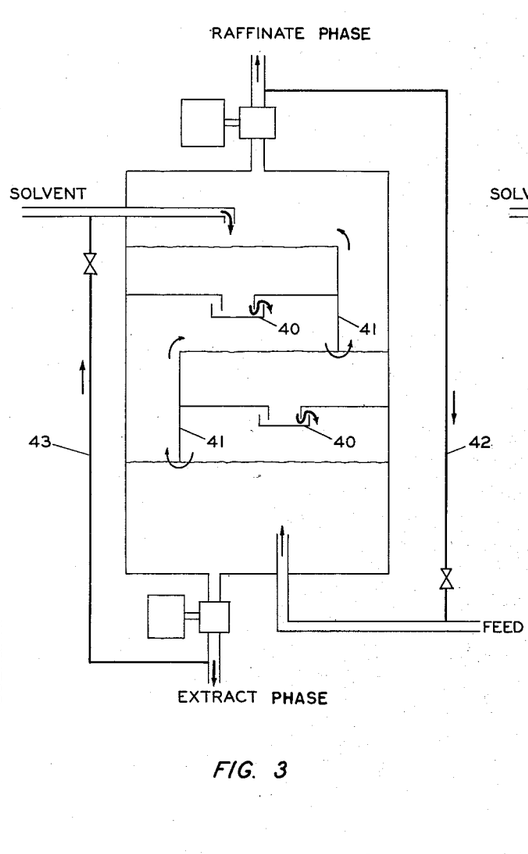
Fig. 3 illustrates a modified method of converting a bubble-cap column to efficient liquid-liquid extraction service. Only two trays are shown in Fig. 3 but it will be understood that the same arrangement may be used on a column with any number of trays.

Fig. 3 portrays an alternative arrangement wherein the bubble caps 40 have been inverted from their usual position. The solvent phase descends through the bubble caps 40 into intimate contact with the hydrocarbon-rich phase just below the trays. The hydrocarbon-rich phase flows up the column via the downcomers 41. While only two trays are shown, it will be understood that the same arrangement may be applied to columns having any number of trays. In columns having a great many trays, it will be preferable to introduce the feed at an intermediate point and to introduce reflux at the bottom of the column in the same manner as explained above.

In Fig. 3 the raffinate phase is recycled via line 42 into admixture with the incoming feed and the extract phase is recycled via line 43 into admixture with the incoming fresh solvent. In applying the principle of Fig. 3 to columns having a great many trays, it will be preferable to have the recycled lines extend across from three to six trays, instead of only two trays as in Fig. 3.

Actual experimental work with a 2-tray liquid-liquid extraction column constructed exactly as in Fig. 3 has shown that the efficiency of columns of the type which were formerly used in extractive distillation service, when converted to liquid-liquid extraction can be greatly increased by recycling a solvent and the stream being processed, i. e., by recycling both extract and raffinate phases. The experimental liquid-liquid contacting studies were conducted with a column constructed as in Fig. 3. The column was 16 inches in diameter and 48 inches high. Four-inch bubble caps were employed. The system benzoic acid-water-kerosene was investigated, water being the dispersed phase and kerosene being the continuous phase. The water was the solvent and the benzoic acid was transferred from the kerosene phase to the water phase. The marked increase in the amount of benzoic acid transferred and the marked increase in the average tray efficiency obtained when the solvent and hydrocarbon streams were recycled as shown in Fig. 3 are indicated by the data in the table.

TABLE

*Effect of recycling solvent and hydrocarbon streams*

[System: benzoic acid-water-kerosene.]

| | Case I | Case II | Case III |
|---|---|---|---|
| Flow Rates, Lb./Hr.: | | | |
| Feed | 10 | 10 | 10 |
| Solvent | 37.4 | 37.4 | 37.4 |
| Withdrawal of Raffinate phase | 10 | 10 | 10 |
| Withdrawal of Extract phase | 37.4 | 37.4 | 37.4 |
| Recycle of Raffinate phase | 0 | 10 | 20 |
| Recycle of Extract phase | 0 | 37.4 | 74.8 |
| Feed + Recycle of Raffinate phase | 10 | 20 | 30 |
| Solvent + Recycle of Extract phase | 37.4 | 74.8 | 112.2 |
| Concentrations of Benzoic Acid, Lb./Lb.: | | | |
| Feed | 0.00659 | 0.00659 | 0.00659 |
| Solvent | 0 | 0 | 0 |
| Withdrawal of Raffinate phase | 0.00572 | 0.00456 | 0.00377 |
| Withdrawal of Extract phase | 0.000232 | 0.000543 | 0.000754 |
| Recycle of Raffinate phase | 0.00572 | 0.00456 | 0.00377 |
| Recycle of Extract phase | 0.000232 | 0.000543 | 0.000754 |
| Feed + Recycle of Raffinate phase | 0.00659 | 0.00558 | 0.00471 |
| Solvent + Recycle of Extract phase | 0.0 | 0.000272 | 0.000503 |
| Pounds Benzoic Acid Transferred per Hr | 0.0087 | 0.0203 | 0.0282 |
| Per Cent | 100 | 233 | 324 |
| Average Tray Efficiency | 5.9 | 9.8 | 11.9 |
| Per Cent | 100 | 166 | 202 |

Figure 4:
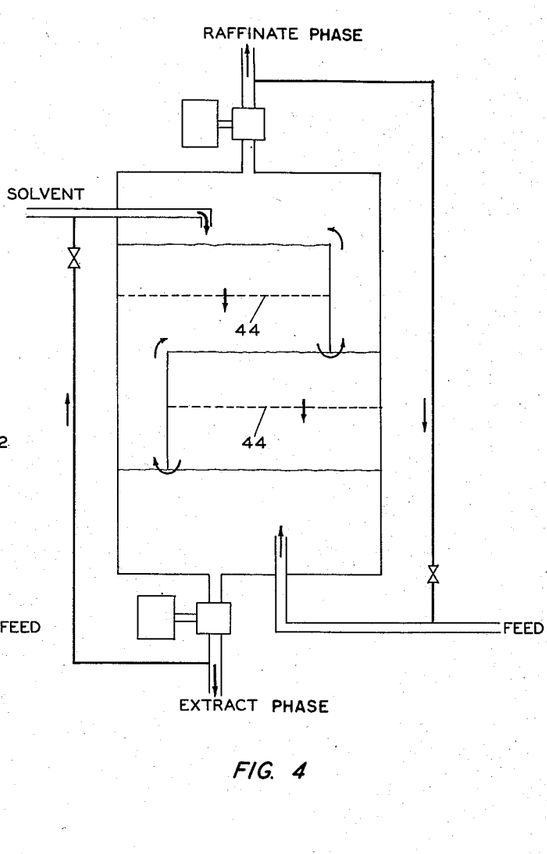
Fig. 4 is generally similar to Fig. 3 except that perforated horizontal trays are employed instead of the bubble caps.

Fig. 4 of the drawing shows a further modification of the invention which is identical with that of Fig. 3 except that perforated trays 44 are employed instead of the bubble trays of Fig. 3. Operation is otherwise identical with that of Fig. 3.

Figure 5:
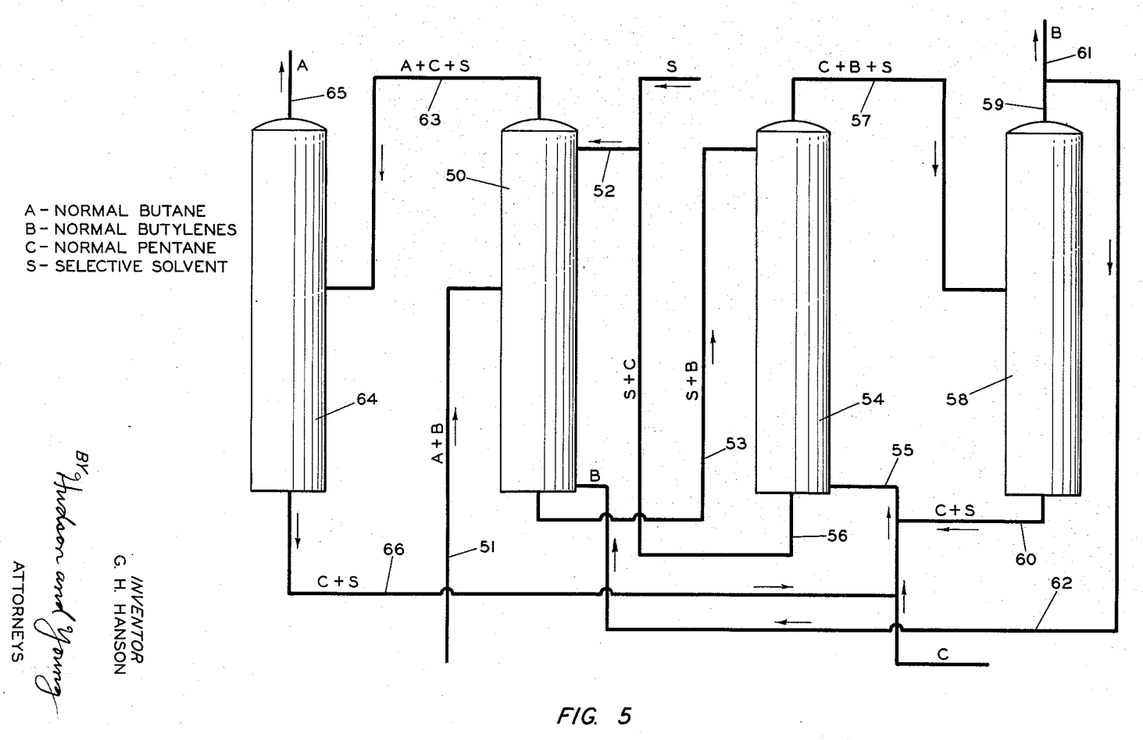
Fig. 5 shows a process of separating normal butylene from normal butane which may utilize the converted fractional distillation or extractive distillation column of the present invention.

Fig. 5 shows one way in which my invention may be applied to effect the separation of normal butylenes from normal butane, as is required following the catalytic dehydrogenation of normal butane to normal butylenes as the first stage in the manufacture of butadiene from normal butane.

In accordance with Fig. 5, the mixture of normal butane and normal butylenes is extracted with a selective solvent such as furfural or ethanolamine. The resulting extract phase is then extracted with a higher boiling saturated aliphatic hydrocarbon, preferably normal pentane. This extracts the normal butylenes from the first extract phase and gives a stream of solvent which can be recycled to the first extraction zone. The resulting mixture of normal pentane and normal butylenes is then fractionally distilled to separate the normal butylenes from the normal pentane which is recycled.

Referring specifically to Fig. 5, the feed mixture of normal butane and normal butylenes enters liquid-liquid extraction column 50 via line 51 and is extracted by solvent introduced via line 52. The resulting extract phase is passed via line 53 to a second liquid-liquid extraction column 54 wherein it is extracted by normal pentane introduced via line 55. This gives a raffinate phase of solvent together with some normal pentane which is recycled via line 56 and an extract phase of normal pentane, normal butylenes and some solvent which is withdrawn via line 57 and passed to fractional distillation column 58. Column 58 separates it into a fraction of normal butylenes withdrawn overhead via line 59 and a fraction of normal pentane together with solvent withdrawn via line 60 and recycled to the bottom of extractor 54. A portion of the normal butylenes overhead is withdrawn via line 61 as one product of the process. The balance is recycled via line 62 to the bottom of extractor 50 as reflux therefor. The raffinate phase from the first extraction is withdrawn via line 63 and passed to fractional distillation column 64 which separates it into a fraction of normal butane raffinate taken overhead via line 65 and a fraction of normal pentane, also containing some solvent, withdrawn via line 66 and recycled to the bottom of extractor 54. The liquid-liquid extraction columns 50 and 54 are constructed in accordance with the principles set forth herein.

From the foregoing description many advantages of the present invention will be apparent to those skilled in the art. The principal advantage of course is that a simple and economically feasible mode of converting an existing fractional distillation or extractive distillation column to efficient liquid-liquid extraction service is provided. Another advantage is that a minimum of modification of such existing columns is required. Another advantage is that such modification as is required does not require changing the interior arrangement of the column; instead exterior pipes with associated pumps are simply connected to the column at the appropriate positions. Many other advantages of my invention will be obvious to those skilled in the art.

I claim:

1. The method of carrying out continuous countercurrent liquid-liquid extraction in a vertical column having horizontal trays therein and arranged to allow solvent to flow downwardly in intimate countercurrent relationship with ascending feed and raffinate phase and to allow separation and maintenance of two separate liquid phases between adjacent trays which comprises continuously introducing a selective solvent into the top of said column and causing same to descend therethrough in intimate countercurrent relationship with ascending feed and raffinate phase, continuously withdrawing extract phase from the bottom of said column, continuously introducing feed to said column at a point therein well below the top of the column and causing same to ascend therethrough, continuously withdrawing raffinate phase from the top of said column, continuously withdrawing raffinate phase from a plurality of points in said column and re-introducing each of the withdrawals into said column at points a plurality of trays below the points of withdrawal thereof, and continuously withdrawing extract phase from a plurality of points in said column and re-introducing each of the withdrawals into said column at points a plurality of trays above the points of withdrawal thereof, said points of withdrawing and re-introducing raffinate phase being so spaced from each other and said points of withdrawing and re-introducing extract phase being so spaced from each other that less than one equilibrium stage would occur therebetween in the absence of said withdrawing and re-introducing of phases.

2. The method of carrying out continuous countercurrent liquid-liquid extraction in a vertical column having horizontal trays therein and arranged to allow solvent to flow downwardly in intimate countercurrent relationship with ascending feed and raffinate phase and to allow separation and maintenance of two separate liquid phases between adjacent trays which comprises continuously introducing a selective solvent into the top of said column and causing same to descend therethrough in intimate countercurrent relationship with ascending feed and raffinate phase, continuously withdrawing extract phase from the bottom of said column, continuously introducing feed to said column at an intermediate point therein and causing same to ascend therethrough continuously withdrawing raffinate phase from the top of said column, separating at least a portion of the extract phase withdrawn from the bottom into extract and solvent components, continuously introducing a portion of the thus-separated extract into the bottom of said column for the purpose of reflux, continuously withdrawing raffinate phase from a plurality of points in said column, said points being spaced at least three but not more than six trays apart along said column, re-introducing each of the withdrawls into said column at points located a plurality of trays below the points of withdrawal thereof, continuously withdrawing extract phase from a plurality of points in said column, said last-named points being spaced at least three but not more than six trays apart along said column, and reintroducing each of the last-named withdrawals into said column at points located a plurality of trays above the points of withdrawal thereof.

3. The method of continuously separating a mixture of aliphatic hydrocarbons of different degrees of saturation into a more saturated fraction and a more unsaturated fraction in a vertical column having horizontal trays therein and arranged to allow solvent to flow downwardly in intimate countercurrent relationship with ascending feed and raffinate phase and to allow separation and maintenance of two separate liquid phases between adjacent trays which comprises continuously introducing a solvent selective for more unsaturated hydrocarbons into the top of said column and causing same to descend therethrough in intimate countercurrent relationship with ascending feed and raffinate phase, continuously withdrawing extract phase comprising more unsaturated hydrocarbon from the bottom of said column, continuously introducing feed consisting of said mixture into said column at an intermediate point therein and causing same to ascend therethrough, continuously withdrawing raffinate phase comprising more saturated hydrocarbon from the top of said column, separating at least a portion of the extract phase withdrawn from the bottom into more unsaturated hydrocarbon extract and solvent components, continuously introducing a portion of the thus separated extract comprising more unsaturated hydrocarbon into the bottom of said column for the puropse of reflux, continuously withdrawing raffinate phase from a plurality of points in said coumn, said points being spaced at least three but not more than six trays apart along said column, re-introducing each of the withdrawals into said column at points located a plurality of trays below said points of withdrawal thereof and not lower than the next lower points of withdrawal of raffinate phase, continuously withdrawing extract phase from a plurality of points in said column, said last-named points being spaced at least three but not more than six trays apart along said column, and re-introducing each of the last-named withdrawals into said column at points located a plurality of trays above said points of withdrawal thereof and not above the next higher points of withdrawal of extract phase.

4. The method of claim 3 wherein the lowermost withdrawal of raffinate phase is re-introduced at the same level as the reflux, a portion of the raffinate phase withdrawn from the top of said column is re-introduced at a point located a pluraility of trays below the top of the column and not lower than the uppermost of said plurality of points of withdrawal of raffinate phase, the uppermost withdrawal of extract phase is re-introduced at the same level as the incoming solvent, and a portion of the extract phase withdrawn from the bottom of said column is re-introduced at a point located a plurality of trays above the bottom of the column and not above the lowermost of said plurality of points of withdrawal of extract phase.

5. A method of carrying out continuous countercurrent liquid-liquid extraction in a vertical column equipped with horizontal trays and arranged to allow solvent to flow downwardly in intimate countercurrent relationship with ascending feed and raffinate phase and to allow separation and maintenance of two separate liquid phases between adjacent trays comprising continuously introducing a stream of feed at an intermediate point in said column, continuously introducing a stream of solvent to the top of said column and causing same to flow downwardly in intimate countercurrent relationship with ascending feed and raffinate phase, continuously withdrawing a stream of solvent phase a plurality of trays below the top and re-introducing it with the fresh solvent, continuously withdrawing a stream of extract phase a plurality of trays below said point of withdrawal of said stream of solvent phase and re-introducing it at a point which is located a plurality of trays above the point of withdrawal thereof and not above said point of withdrawal of said stream of solvent phase, continuing in this manner throughout the remainder of the column, withdrawing the extract phase from the bottom of the column and re-introducing a portion thereof at a point located a plurality of trays above the bottom of the column and not above the next higher point of withdrawal of extract phase, introducing reflux into the bottom of the column, withdrawing a first stream of raffinate phase from a point a plurality of trays above the bottom of said column and re-introducing it with the reflux, withdrawing a second stream of raffinate phase a plurality of trays above said point of withdrawal of said first stream of raffinate phase and re-introducing it at a point which is a plurality of trays below said point of withdrawal thereof and not below said point of withdrawal of said first stream of raffinate phase, continuing in this manner throughout the remainder of the column, withdrawing the raffinate phase from the top of the column and re-introducing a portion thereof at a point which is a plurality of trays below the top of the column and not below the next lower point of withdrawal of raffinate phase, said points of withdrawing and re-introducing extract phase being so spaced from each other and said points of withdrawing and re-introducing raffinate phase being so spaced from each other that less than one equilibrium stage would occur therebetween in the absence of said withdrawing and re-introducing of phases.

6. The method of claim 5 wherein the volume of each of said streams of withdrawn and re-introduced extract phases and raffinate phases is at least equal to that of the fresh solvent and feed respectively.

7. A method of carrying out continuous countercurrent liquid-liquid extraction in a vertical column having horizontal trays separating same into a plurality of superimposed contacting and phase separating zones comprising continuously introducing feed to an intermediate point in said column, continuously introducing solvent to the top of said column, continuously withdrawing extract phase from the bottom of said column, continuously withdrawing raffinate phase from the top of said column, and continuously and throughout the column recycling separated raffinate phase to lower points in the flow of raffinate phase through the column and recycling separated extract phase to higher points in the flow of extract phase through the column, each said recyclings being around sections of the column in which less than one equlibrium stage would occur in the absence of said recyclings, thereby greatly increasing the tray efficiency of the column.

8. The method of claim 7 wherein the rate of recycling of both extract and raffinate phases is at least equal to the rate of introduction of fresh solvent and feed to the column respectively.

9. Apparatus for carrying out liquid-liquid extraction comprising a conventional fractional distillation column having the usual bubble trays equipped with bubble caps over openings therethrough for up-flowing fluids and downcomers for passing down-flowing liquid from each tray to a lower tray, a conduit for introducing feed at an intermediate point in said column, a conduit for introducing solvent into the top of said column, a conduit for withdrawing extract phase from the bottom of said column, a conduit for withdrawing raffinate phase from the top of said column, said column being sub-divided throughout its length into a plurality of sections each of said sections comprising a plurality of said bubble trays, contiguous sections being in communication with each other, means for withdrawing raffinate phase from the top of each of said sections and recycling same into the bottom of the said section, and means for withdrawing extract phase from the bottom of each of said sections and recycling same into the top of the said section.

10. Apparatus as in claim 9 wherein each of said means comprises a conduit along the outside of said column.

11. Apparatus for carrying out liquid-liquid extraction comprising a vertical column having horizontal trays dividing same into a plurality of superimposed contacting and settling zones, means for allowing solvent to pass downwardly through the column, means for allowing raffinate phase to pass upwardly through the column, means for effecting intimate countercurrent contacting of the extract and raffinate phases in each of said zones, a conduit for introducing solvent into the top of said column, a conduit for introducing feed into said column at a lower point therein, a conduit for withdrawing raffinate phase from the top of said column, a conduit for withdrawing extract phase from the bottom of said column, means exterior to said column for recycling raffinate phase downwardly along the entire length of said column, no single raffinate recycle extending across more than six of said zones, and means exterior to said column for recycling extract phase upwardly along the entire length of said column, no single extract recycle extending across more than six of said zones.

12. A method of claim 3 further characterized by subjecting said mixture of aliphatic hydrocarbons of different degrees of unsaturation to extraction as described in the said column, hereinafter referred to as the first column, with a selective solvent containing some higher-boiling aliphatic saturated hydrocarbon, separately withdrawing from said first column a first raffinate phase comprising a more saturated fraction of said mixture together with said higher-boiling hydrocarbon and a first extract phase comprising a more unsaturated fraction of said mixture dissolved in said selective solvent, subjecting said first extract phase as feed to countercurrent liquid-liquid extraction with a secondary solvent composed principally of said higher-boiling hydrocarbon introduced into the bottom of a second vertical column having horizontal trays therein and arranged to allow secondary solvent to flow upwardly in intimate countercurrent relationship with descending feed and second raffinate phase and to allow separation and maintenance of two separate liquid phases between adjacent trays with recycle of raffinate phases and extract phases throughout the length of said second column in the manner described in claim 3 with respect to said first column but in opposite direction, separately withdrawing from said second column a second raffinate phase comprising said solvent and some higher-boiling hydrocarbon and a second extract phase comprising said higher-boiling hydrocarbon and said fraction of more unsaturated hydrocarbon, recycling said second raffinate phase to the first-named column as the solvent therefor, fractionally distilling said second extract phase to separate same into an overhead fraction of said more unsaturated hydrocarbon as extract and a bottom fraction of said higher-boiling hydrocarbon, recycling a portion of said overhead fraction as reflux to said first-named column, fractionally distilling said first raffinate phase to separate same into an overhead fraction of said more saturated hydrocarbon and a bottom fraction of said higher-boiling hydrocarbon, and recycling both of said bottom fractions to said second-named column as the solvent therefor.

13. The method of claim 12 wherein said mixture comprises normal butane as the more saturated hydrocarbon and normal butylenes as the more unsaturated hydrocarbon and wherein said higher-boiling hydrocarbon is normal pentane.

14. A method of carrying out continuous liquid-liquid extraction which comprises continuously passing a stream of raffinate phase comprising a liquid feed and a stream of extract phase comprising a liquid solvent through an elongated extraction zone countercurrently to and in intimate contact with each other, continuously withdrawing extract phase from one end of said zone, continuously withdrawing raffinate phase from the opposite end of said zone, continuously separating raffinate phase from extract phase at a plurality of points along said zone, continuously withdrawing so-separated raffinate phase from at least one of said points and recycling same backward toward said one end of said zone into the stream of raffinate phase at an earlier point in its flow than the point of withdrawal, and continuously withdrawing so-separated extract phase from at least one of said points and recycling same backwards toward said opposite end of said zone into the stream of extract phase at an earlier point in its flow than the point of withdrawal, each said recyclings being around sections of said elongated extraction zone in which less than one equilibrium stage would occur in the absence of said recyclings.

GEORGE H. HANSON.

REFERENCES CITED

The following references are of record in the file of this patent:

UNITED STATES PATENTS

| Number | Name | Date |
| --- | --- | --- |
| 2,054,295 | Merrill | Sept. 15, 1936 |
| 2,081,719 | Van Dijck | May 25, 1937 |
| 2,091,078 | McKittrick et al. | Aug. 24, 1937 |
| 2,147,786 | Fenske et al. | Feb. 21, 1939 |
| 2,149,643 | Tijmstra | Mar. 7, 1939 |
| 2,151,529 | Roberts | Mar. 21, 1939 |
| 2,151,592 | Ferris | Mar. 21, 1939 |
| 2,153,507 | Mann | Apr. 4, 1939 |
| 2,191,919 | Thayer | Feb. 27, 1940 |
| 2,274,030 | Atkins | Feb. 24, 1942 |
| 2,346,491 | Kiersted | Apr. 11, 1944 |
| 2,468,044 | Davis | Apr. 26, 1949 |

FOREIGN PATENTS

| Number | Country | Date |
| --- | --- | --- |
| 441,104 | Great Britain | Jan. 13, 1936 |